(12) United States Patent
Shields

(10) Patent No.: US 9,516,972 B2
(45) Date of Patent: *Dec. 13, 2016

(54) ELECTRONICALLY CONTROLLED NUTRITIONAL FLUID WARMER

(71) Applicant: Angele Innovations, LLC, San Marcos, CA (US)

(72) Inventor: Janice M. Shields, San Marcos, CA (US)

(73) Assignee: Angele Innovations, LLC, San Marcos ( * ) Notice: Subject to any disclaimer, the term of this patent is extended or adjusted under 35 U.S.C. 154(b) by 417 days.

This patent is subject to a terminal disclaimer.

(21) Appl. No.: 14/106,085

(22) Filed: Dec. 13, 2013

(65) Prior Publication Data

US 2015/0164269 A1    Jun. 18, 2015

(51) Int. Cl.
*A21D 8/06* (2006.01)
*A47J 36/24* (2006.01)

(52) U.S. Cl.
CPC ..................................... *A47J 36/24* (2013.01)

(58) Field of Classification Search
CPC ....... A47J 36/24; A47J 36/2438; B65D 33/16; B65D 33/34
See application file for complete search history.

(56) References Cited

U.S. PATENT DOCUMENTS

| 4,732,148 | A | 3/1988 | L'Esperance, Jr. | |
|---|---|---|---|---|
| 4,784,135 | A | 11/1988 | Blum | |
| 5,104,218 | A | 4/1992 | Garner | |
| 6,417,498 | B1 * | 7/2002 | Shields | A47J 36/2427 219/386 |
| 2008/0093357 | A1 * | 4/2008 | Norman | B65D 81/34 219/521 |
| 2012/0061376 | A1 | 3/2012 | McBean | |
| 2012/0271271 | A1 | 10/2012 | Hyun | |
| 2013/0237957 | A1 | 9/2013 | Hyun | |

* cited by examiner

*Primary Examiner* — Steven Leff
(74) *Attorney, Agent, or Firm* — Nydegger & Associates

(57) ABSTRACT

A system and method are provided for warming a nutritional substance (i.e. mother's milk or formulated liquids) for ingestion by a neonate. Structurally, the system includes a warmer for holding a container of the nutritional substance as it is simultaneously vibrated and warmed in preparation for the neonate, and it includes a controller which determines how the system will be operated. For an operation of the present invention, a user provides input to the system controller to establish a mode of operation (e.g. warming; warming-frozen; or thawing). The user will also input a predetermined protocol to the controller. During the operation, a heat sensor monitors temperatures of the nutritional substance which are provided as feedback input to the controller for operating the warmer in accordance with the protocol.

13 Claims, 3 Drawing Sheets

ELECTRONICALLY CONTROLLED NUTRITIONAL FLUID WARMER

FIELD OF THE INVENTION

The present invention pertains generally to systems and methods for preparing nutritional liquids for ingestion by neonates. More particularly, the present invention pertains to systems and methods for controlling the temperature and consistency requirements that need to be achieved during a preparation of nutritional liquids for ingestion by neonates. The present invention is particularly, but not exclusively, useful as a system and method which provides for a customized preparation of nutritional liquids (substances) for ingestion by neonates, wherein the preparation is controlled under sanitary conditions to achieve specific results in accordance with a predetermined protocol.

BACKGROUND OF THE INVENTION

Preferably, neonates are suckled when fed mother's milk. For any of several different reasons, however, suckling may not be possible or convenient. In such cases, either preserved mother's milk or any of various formulated liquids may need to be substituted. Nevertheless, if the neonate cannot be suckled, the nutritional liquid that is fed to the neonate still needs to have a proper consistency, and it must also be within an appropriate temperature range.

Preserving mother's milk or formulated liquids for subsequent use typically requires refrigeration. This results in either cooling or freezing of the nutritional substance which, in turn, requires a subsequent thawing and/or heating of the preserved mother's milk or formulated liquid. In the event, such heating must be complete, and it must result in a homogeneous nutritional liquid. Otherwise, an improperly, non-uniformly heated nutritional liquid results, and its use may be problematical for a neonate.

In light of the above, it is an object of the present invention to provide a system and method for warming a nutritional substance for ingestion by a neonate which predictably prepares the nutritional substance for this purpose. Another object of the present invention is to provide a system and method for warming a nutritional substance for a neonate which can be customized to achieve the desired result, regardless of the pre-condition of the nutritional substance. Yet another object of the present invention is to provide a system and method for warming a nutritional substance for a neonate which is easy to set up, is simple to operate, and is comparatively cost effective.

SUMMARY OF THE INVENTION

In accordance with the present invention, a system for warming a nutritional substance for a neonate includes a container, such as a syringe, which is filled to hold a predetermined volume of the nutritional substance (e.g. mother's milk). The filled container is then inserted into a liquid-lined pouch. At this point, the pouch is sealed to enclose and hold the container within the pouch, and to thereby establish intimate contact between the container (nutritional substance) and the liquid-liner of the pouch. Alternatively, the liquid-lined pouch can be prefilled. Preferably, the liquid used for the liquid-lined pouch is either sanitized water or a sanitized gel type substance.

As a component of the system for the present invention, a nutritional warmer is provided for warming the nutritional substance in the container. Structurally, the warmer includes a base member that is formed with at least one well. Each well in the base member has a wall, and each well is dimensioned to receive a respective container in a pouch. Importantly, in this combination, contiguous contact is established between the wall of the well and the pouch, and between the pouch and the container (nutritional substance).

Additional components of the nutritional warmer include a heater and a vibrator. In particular, a heater is mounted on the base member, and it is selectively operated for transferring heat to the nutritional substance in the container. This, of course, is done while the container and the pouch are positioned in the well. Also, a vibrator is mounted on the base member for vibrating the well as heat is being transferred from the heater, and through the pouch, to the nutritional substance in the container. In detail, the vibrator will typically include a shaft which is connected with the well, and which is aligned with a central axis that is defined by the well. Also, the vibrator includes an off-axis weight that is connected to the well. Consequently, when the shaft is rotated by a motor, the off-axis weight will cause the well to vibrate the well. In turn, this will cause the nutritional substance (liquid) in the pouch to also be vibrated (agitated), and thereby facilitate the heating and preparation of the nutritional substance for subsequent ingestion by a neonate.

For operating the present invention, the system includes a controller which is mounted on the base member. Further, the controller is operationally connected with the heater and with the vibrator. Within this structural combination, the controller is selectively programmed by a user to activate both the heater and the vibrator for simultaneously heating and vibrating the nutritional substance in the container. Importantly, this operation is accomplished in accordance with a predetermined protocol which prepares the nutritional substance for subsequent ingestion by the neonate by accounting for the pre-operational condition of the nutritional substance.

In accordance with the present invention, an operation starts when a user provides input to the controller. In particular, the input is in two parts. One part (i.e. mode data) pertains to the initial physical condition of the nutritional substance. The other part (i.e. protocol data) pertains to the amount of the nutritional substance that is to be warmed. In use, the mode data will establish whether the nutritional substance is initially at room temperature (this requires a warming mode), whether the nutritional substance has been refrigerated (this requires a warming-frozen mode), or whether it has been previously frozen and now needs to be thawed for further short term storage (this requires the thaw mode). In any event, the protocol data is dependent on the mode data.

In a preferred mode of operation, the protocol data is used to establish closed loop control, using temperature feedback, for the system. More specifically, for the preferred embodiment, a maximum temperature ($T_{max}$) is established by the protocol data for the nutritional substance. As a practical matter, $T_{max}$ will be in a range between 96° F. and 99° F. The controller then monitors the actual temperature (T) of the nutritional substance, as it is being warmed, to determine when T is equal to $T_{max}$. When T=$T_{max}$, the controller will activate an overtime modality for operation of the system, and will provide a display which will notice the user that the nutritional substance is "Ready To Feed." For the convenience of the user, if the nutritional substance is not fed immediately to a neonate, an overtime modality is initiated by the controller which includes a pulse cycle. As intended for the present invention, the pulse cycle provides intermittent intervals for warming the nutritional substance that will keep it "Ready To Feed" for a predetermined period of time (e.g. 30 minutes).

In an alternate embodiment, the protocol data can be used to establish an open loop control for the system. In this case, the protocol data is selected and used according to the volume of nutritional substance that is to be prepared. Also, the protocol data establishes the appropriate rate for heating the nutritional substance for compliance with requirements of the selected mode data. More specifically, the protocol data will establish the time duration for an operation of the controller that will achieve the intended final physical characteristic of the nutritional substance. In general, the protocol data will determine an operational time duration chosen from the group consisting of 5-12 minutes for the warming mode, 10-18 minutes for the warming-frozen mode, and 15-25 minutes for the thaw mode. Additionally, the predetermined protocol will include an overtime modality disclosed above to indicate an imminent cessation of system operation. And, it will also include a standby modality to indicate an availability of the system for resumption of operation.

As an added feature for the present invention, the system may include a unit for sanitizing the water that is to be used for filling the liner of the pouch. If used, this unit will include a receptacle for holding water that can either be a stand-alone unit or be selectively engaged with the system's base member. Further, a source of ultra-violet (UV) light is connected with the receptacle and is provided for selectively radiating UV light through water in the receptacle. Specifically, as indicated above, this is done to sanitize the water in the receptacle for use in filling the liquid-lining of the pouch. Also, a liquid pump can be mounted on the receptacle for transferring sanitized water from the receptacle to the pouch. And, optionally, a heater can be mounted on the receptacle to pre-heat the water in the receptacle.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
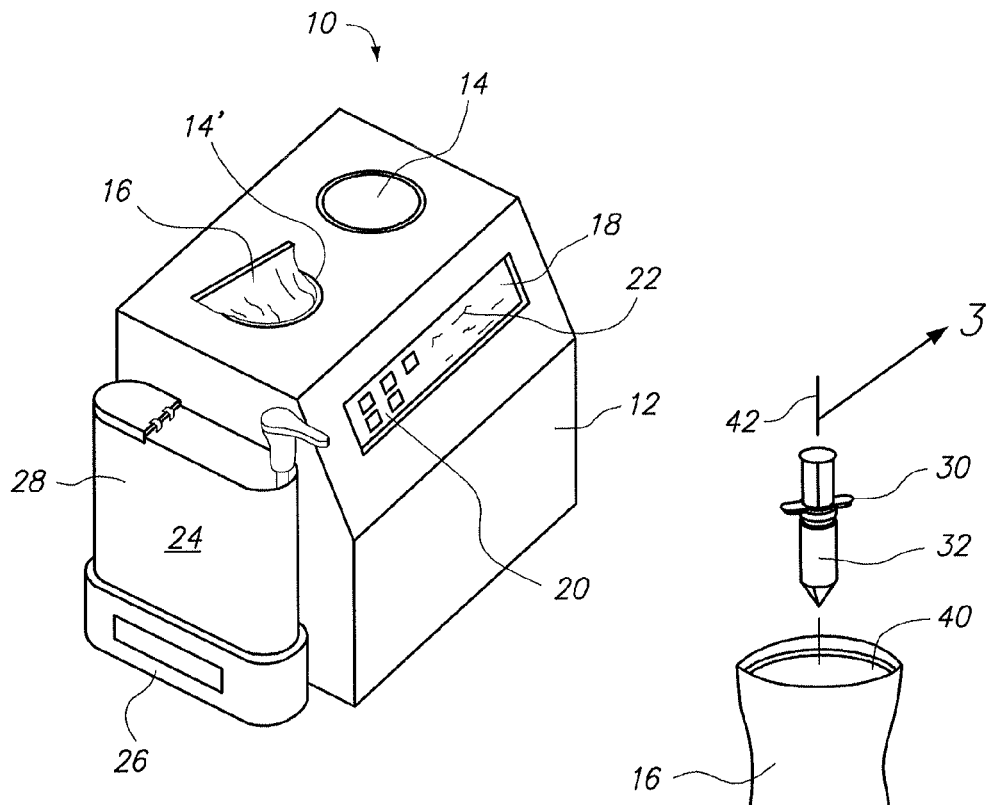
FIG. 1 is a perspective view of a warming system in accordance with the present invention.

Referring initially to FIG. 1, a system for warming a nutritional substance for a neonate in accordance with the present invention is shown and is generally designated 10. As shown, the system 10 includes a base member 12 that is formed with at least one well 14. Further, in FIG. 1, a pouch 16 is shown inserted into a well 14'. It is also shown in FIG. 1 that the base member 12 includes a display panel 18 which presents control input pads 20, and provides operational notices 22 that pertain to an operation of the system 10.

Additionally an adapter 24 is shown associated with the system 10. Specifically, the adapter 24 includes a platform 26 which includes an Ultraviolet (UV) light source (not shown) for sanitizing water that is being held in the receptacle 28. As intended for the present invention, the UV adapter 24 will preferably be of a type that is disclosed and claimed in pending U.S. patent application Ser. No. 13/967,127 by Janice M. Shields, inventor, for an invention entitled "UV Adapter for Preparation of Neonate Nutritional Fluid."

Figure 2:
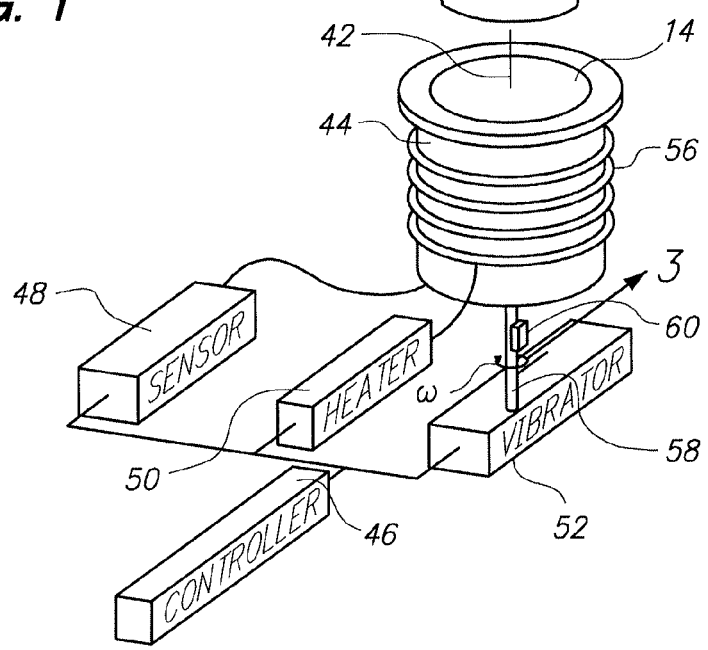
FIG. 2 is an exploded perspective view of operational components of the warming system.

Referring now to FIG. 2, several essential operational components for the system 10 are shown in their functional combination with each other. In particular, these components of the system 10 include a container 30 for holding a nutritional substance 32 that is to be ingested by a neonate (not shown). For the present invention, the container 30 may be a syringe, as shown, or it may be any other type of container that is well known in the pertinent art, and is useful for the purpose of holding a nutritional substance. Further, as envisioned for the present invention, the nutritional substance 32 is preferably mother's milk. The nutritional substance 32 may, however, be a prepared formula or it may be any other liquid substance that has been prescribed by appropriate medical personnel.

Figure 3:
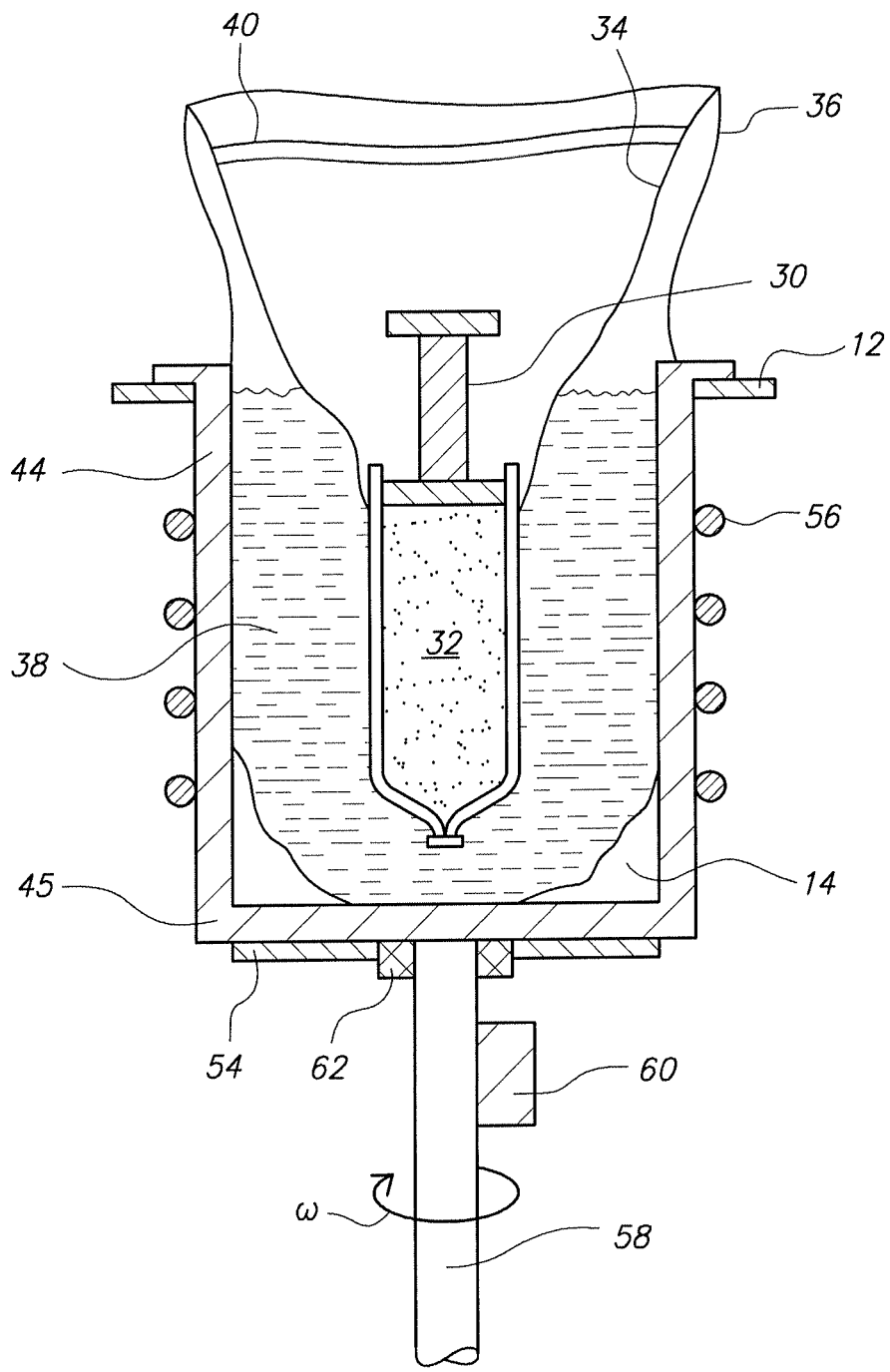
FIG. 3 is a cross-section view of selected operational components of the system for the present invention as seen, in combination, along the line 3-3 in FIG. 2.

Still referring to FIG. 2, the pouch 16 is shown positioned to receive and enclose the container 30 with its contents, the nutritional substance 32. As best seen in FIG. 3, the pouch 16 includes an inner bag 34 and an outer bag 36. In their combination with each other, the inner bag 34 is positioned inside the outer bag 36 and their respective openings are attached to each other. Thus, a compartment is created between the inner bag 34 and the outer bag 36 for holding a sanitized water/gel 38. Further, a fastener 40 can be provided, as shown, which can be used to enclose the container 30 within the inner bag 34. For alternate embodiments of the present invention, the pouch 16 can either be prefilled with sanitized water/gel 38, or it can be filled on-site by employing the UV adapter 24.

As shown in FIG. 2, the well 14 is essentially a hollow, cylindrical shaped structure which defines a central axis 42. The well 14 has a wall 44 with a base 45 and, as implied above, the well 14 is dimensioned to receive the pouch 16 with the container 30 enclosed in the pouch 16. For purposes of the present invention, the wall 44 of the well 14 may be made of a metal, or it may be made of a ceramic or include a ceramic liner. In any case, it is important that the wall 44 of well 14, and its base 45, be made of a heat conductive material.

FIG. 2 also shows that the system 10 includes a controller 46 that is electronically connected with a heat sensor 48, a heater 50, and a vibrator 52. With this combination, it is to be appreciated that the controller 46 is also electronically connected to the control input pads 20 shown in FIG. 1. Further, by cross referencing FIG. 2 with FIG. 3, it will be seen that the heat sensor 48 is connected to a thermistor 54 that is affixed to base 45 of the wall 44 of well 14. It will also be seen that the heater 50 is connected with a heating coil 56 that is positioned on the wall 44 to surround the well 14. Additionally, the system 10 includes a shaft 58 which interconnects the vibrator 52 with the well 14. With this interconnection, it is to be further appreciated that the vibrator 52 includes a motor (not shown) which will rotate the shaft 58 at an angular velocity w. As a consequence of this rotation, an off-axis weight 60 that is attached to the shaft 58 will vibrate the well 14. Specifically, with an end of the shaft 58 positioned in a recess 62 that is located on the base 45 of wall 44, the shaft 58 can be rotated independently of the well 14. The consequence here is that the off-axis weight 60 will cause flexions of the shaft 58 as the shaft 58 is rotated. In turn, these flexions will vibrate the well 14.

Figure 4:
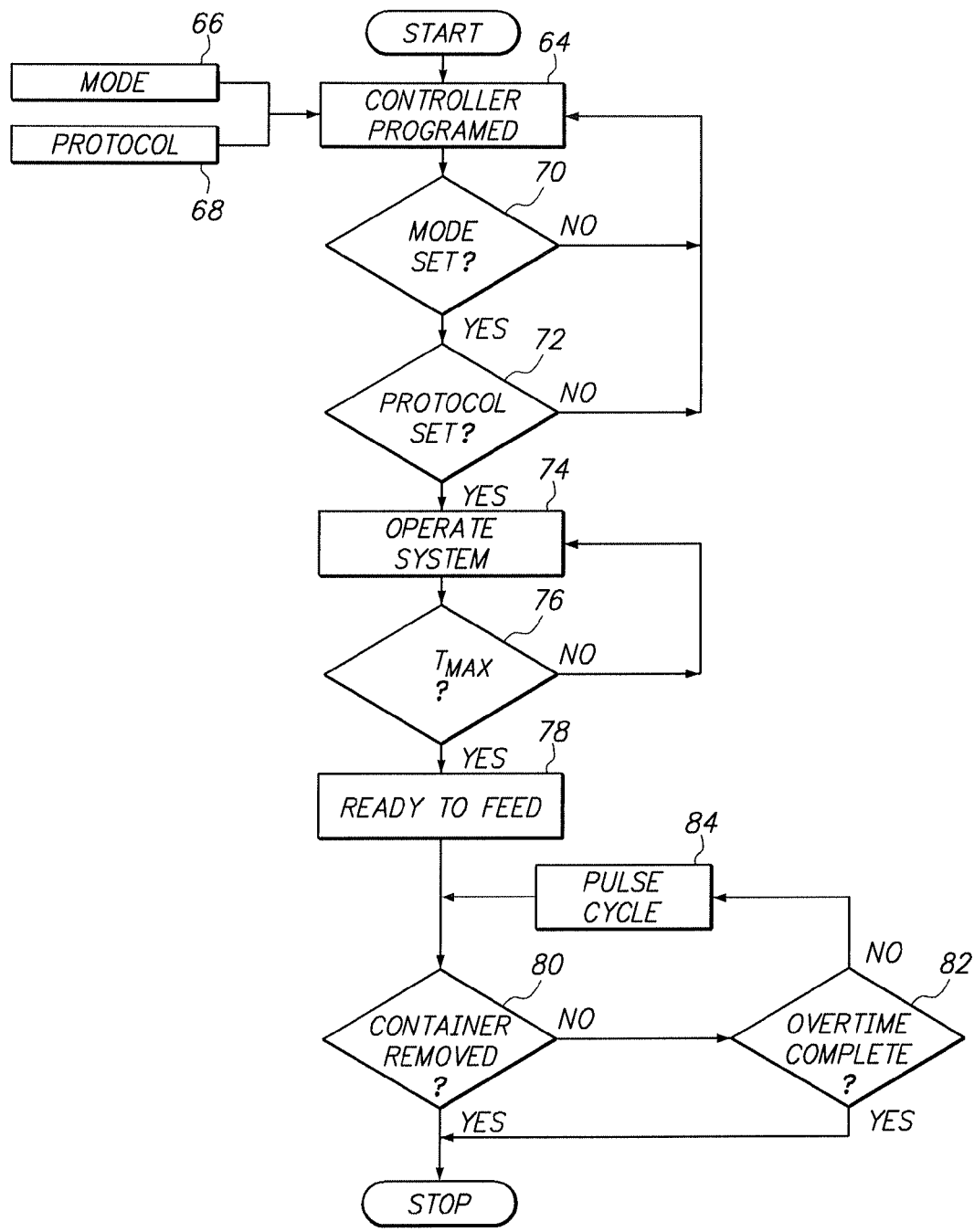
FIG. 4 is a logic flow chart for an operation of the present invention.

For an operational set up of the system 10, FIG. 4 indicates that the first task here involves programming the controller 46 (see action block 64). Specifically, this requires use of the control input pads 20 to input mode data (see action block 66) and protocol data (see action block 68). Whether this input has been completed, and has been properly accomplished, is checked (see inquiry blocks 70 and 72) before the system 10 is operated (see action block 74).

An operation of the system 10 effectively depends on the mode data and the protocol data that is input to the controller 46 (see action blocks 66 and 68). In general, the mode data will be indicative of an initial physical characteristic of the nutritional substance 32. For instance, the mode data will establish whether the nutritional substance 32: a) is initially at room temperature (this requires a warming mode); b) has been refrigerated (this requires a warming-frozen mode); or c) has been previously frozen and now needs to be thawed for further short term storage (this requires a thawing mode). On the other hand, the protocol data will be based on the size and volume of the nutritional substance 32 that is to be warmed. The purpose here is to operate the system 10 according to a predetermined protocol that will achieve an intended final, physical characteristic for the nutritional substance 32. To do this, the protocol data will establish whether the system 10 will operate with an open loop control, or with a closed loop, feedback control.

In a preferred mode of operation for the system 10, the protocol data that is used will establish a closed loop control, using temperature feedback. In this case a maximum temperature ($T_{max}$) for the nutritional substance 32 is established by the protocol data that is input to the controller 46 (see action block 68). Typically, $T_{max}$ will be in a range between 96° F. and 99° F. When the nutritional substance 32 is to be thawed, however, $T_{max}$ may more appropriately be established at, or below, room temperature for storage and/or refrigeration.

During a closed loop control of the system 10, the controller 46 uses the heat sensor 48 and its thermistor 54 to continuously monitor the actual temperature (T) of the nutritional substance. When T is equal to $T_{max}$ (see inquiry block 76) the controller 46 will provide a notice 22 on the display panel 18 for the user. Specifically, this notice 22 will indicate that the nutritional substance 32 is "Ready To Feed" (see action block 78). Alternatively, a notice 22 can be given that the nutritional substance 32 has been thawed. In any event, the system 10 will deactivate the heater 50 and determine whether the pouch 16 has been removed from the well 14 (see inquiry block 80). As envisioned for the present invention, the determination concerning removal of the pouch 16 can be made in any manner well known in the pertinent art, such as by using a light switch (not shown).

For the convenience of the user, if the pouch 16 has not been removed from the well 14, an overtime modality is initiated by the controller 46. If the overtime modality is used, an inquiry is made into whether the overtime has expired (see inquiry block 82). If overtime has not expired, a pulse cycle is activated (see action block 84). As intended for the present invention, the pulse cycle provides for warming the nutritional substance 32 during intermittent time intervals (e.g. warming for one out of every five minutes) established by the protocol data during set up. The intended result here is to keep the nutritional substance 32 "Ready To Feed" for a predetermined period of time (e.g. 30 minutes).

As indicated above, for an alternative to closed loop control, the protocol data can be used to establish an open loop control for the system 10. In this case, the protocol data is selected and is used according to the volume of nutritional substance 32 that is to be prepared. Also, the protocol data establishes an appropriate rate for a heating of the nutritional substance 32 that will comply with requirements of the selected mode data. More specifically, the protocol data will establish the time duration for an operation of the controller 46 that will achieve the intended final, physical characteristic of the nutritional substance. In general, the protocol data will determine an operational time duration that may be 5-12 minutes for the warming mode, 10-18 minutes for the warming-frozen mode, or 15-25 minutes for the thaw mode. Additionally, like the closed loop control, the predetermined protocol for open loop control will include the overtime modality that is disclosed above to maintain the nutritional substance at the appropriate temperature and to indicate an imminent cessation of system operation. Regardless of other control considerations, a standby modality to indicate an availability of the system for resumption of operation can be provided.

While the particular Electronically Controlled Nutritional Fluid Warmer as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A system for warming a nutritional substance for a neonate which comprises:
   a container for holding a predetermined volume of a nutritional substance for subsequent ingestion by a neonate;
   a liquid-lined pouch for holding the container of the nutritional substance;
   a base member formed with at least one well, wherein the well has a wall and is dimensioned to receive the combined pouch and container therein to establish a contiguous contact between the wall of the well and the pouch, and between the pouch and the container;
   a heater mounted on the base member for transferring heat to the nutritional substance when the container and the pouch are positioned in the well;
   a vibrator mounted on the base member for vibrating the well during heat transfer from the heater, through the pouch, and to the nutritional substance;
   a heat sensor mounted on the wall of the well for measuring temperatures of the nutritional substance in the container;
   a platform affixed to the base member;
   a bracket affixed to the base member;
   a receptacle for holding water, wherein the receptacle is selectively engaged with the bracket to hold the receptacle on the platform;
   a source of ultra-violet (UV) light mounted on the platform for selectively radiating UV light through water in the receptacle to sanitize the water for use in establishing the liquid-lining of the pouch;
   a liquid pump mounted on the receptacle for transferring sanitized water from the receptacle to the pouch; and
   a controller connected with the heater, with the vibrator, and with the heat sensor, wherein the controller is selectively programmed by a user to activate the heater and the vibrator to simultaneously heat and vibrate the nutritional substance in the container in accordance with a predetermined protocol, wherein the protocol is responsive to temperatures of the nutritional substance, as measured by the heat sensor, and the protocol is implemented by the controller to prepare the nutritional substance for subsequent ingestion by the neonate.

2. A system as recited in claim 1 wherein the well defines an axis and the vibrator comprises:
   a shaft connected with the well and aligned with the axis;
   an off-axis weight connected to the well; and
   a motor for rotating the shaft to vibrate the well.

3. A system as recited in claim 1 wherein the liquid used for the liquid-lined pouch is sanitized water.

4. A system as recited in claim 1 wherein the nutritional substance is mother's milk.

5. A system as recited in claim 1 wherein the container is a syringe, and the heat sensor is a thermistor.

6. A system as recited in claim 1 further comprising a heater mounted on the platform to pre-heat water in the receptacle.

7. A system as recited in claim 1 wherein the predetermined protocol receives input from a user for operation of the controller, and wherein the input includes:
   mode data, wherein the mode data is indicative of an initial physical characteristic of the nutritional substance; and
   protocol data, wherein the protocol data is based on the volume of the nutritional substance to be warmed in order to achieve an intended final physical characteristic for the nutritional substance.

8. A system as recited in claim 7 wherein the mode data is selected from the group consisting of warming refrigerated milk, warming room temperature milk, and thawing.

9. A system as recited in claim 8 wherein the predetermined protocol includes an overtime modality to indicate an imminent cessation of system operation and a standby modality to indicate availability of the system for resumption of operation, wherein the overtime modality includes a pulse cycle to maintain the nutritional substance at a temperature in a range between 96° F. and 99° F.

10. A system for warming a nutritional substance for a neonate which comprises:
    a container for holding a predetermined volume of a nutritional substance for subsequent ingestion by a neonate;
    a liquid-lined pouch for holding the container of the nutritional substance;
    a base member formed with at least one well, wherein the well defines an axis and has a wall, and further wherein the well is dimensioned to receive the combined pouch and container therein to establish a contiguous contact between the wall of the well, the pouch and the container;
    a heater mounted on the base member for transferring heat to the nutritional substance when the container and the pouch are positioned in the well;
    a heat sensor mounted on the wall of the well for measuring temperatures of the nutritional substance in the container;
    a shaft connected with the well and aligned with the axis;
    an off-axis weight connected to the well;
    a motor mounted on the base member for rotating the shaft to vibrate the well during heat transfer from the heater, through the pouch, and to the nutritional substance;
    a platform affixed to the base member;
    a bracket affixed to the base member;
    a receptacle for holding water, wherein the receptacle is selectively engaged with the bracket to hold the receptacle on the platform;
    a source of ultra-violet (UV) light mounted on the platform for selectively radiating UV light through water in the receptacle to sanitize the water for use in establishing the liquid-lining of the pouch;
    a liquid pump mounted on the receptacle for transferring sanitized water from the receptacle to the pouch;
    a heater mounted on the platform to pre-heat water in the receptacle; and
    a controller connected with the heater, with the motor, and with the heat sensor, wherein the controller is selectively programmed by a user to activate the heater, and the motor, to simultaneously heat and vibrate the nutritional substance in the container in accordance with a predetermined protocol, wherein the predetermined protocol is based on mode data indicative of an initial physical characteristic of the nutritional substance, and protocol data is based on the volume of the nutritional substance to be warmed, and wherein the protocol is responsive to temperatures of the nutritional substance, as measured by the heat sensor, and the protocol is implemented by the controller for operation of the controller to achieve an intended final physical characteristic of the nutritional substance suitable for subsequent ingestion by the neonate.

11. A system as recited in claim 10 wherein the nutritional substance is mother's milk.

12. A system as recited in claim 10 wherein the liquid used for the liquid-lined pouch is sanitized water, wherein the nutritional substance is mother's milk, and wherein the container is a syringe, and the heat sensor is a thermistor.

13. A system as recited in claim 10 wherein the mode data is selected from the group consisting of warming refrigerated milk, warming room temperature milk, and thawing, and further wherein the predetermined protocol includes an overtime mode to indicate an imminent cessation of system operation and a standby mode to indicate availability of the system for resumption of operation.

\* \* \* \* \*